(12) United States Patent
Shibata et al.

(10) Patent No.: US 10,116,463 B2
(45) Date of Patent: Oct. 30, 2018

(54) BRIDGING APPARATUS

(71) Applicant: Mitsubishi Electric Corporation, Tokyo (JP)

(72) Inventors: Koji Shibata, Tokyo (JP); Katsuyoshi Takahashi, Tokyo (JP); Yasuomi Ando, Tokyo (JP); Masanori Hashimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/315,039

(22) PCT Filed: Jun. 13, 2014

(86) PCT No.: PCT/JP2014/003149
§ 371 (c)(1),
(2) Date: Nov. 30, 2016

(87) PCT Pub. No.: WO2015/189876
PCT Pub. Date: Dec. 17, 2015

(65) Prior Publication Data
US 2017/0163441 A1 Jun. 8, 2017

(51) Int. Cl.
*H04L 12/46* (2006.01)
*H04L 1/00* (2006.01)
(Continued)

(52) U.S. Cl.
CPC .......... *H04L 12/462* (2013.01); *H04L 1/0027* (2013.01); *H04L 1/1854* (2013.01);
(Continued)

(58) Field of Classification Search
None
See application file for complete search history.

(56) References Cited

U.S. PATENT DOCUMENTS 6,337,852 B1 * 1/2002 Desnoyers ........ G06F 15/17368
370/235
6,456,597 B1 * 9/2002 Bare ................. H04L 29/12009
370/252
(Continued)

FOREIGN PATENT DOCUMENTS

JP 04-081042 A 3/1992
JP 05-053953 A 3/1993
(Continued)

OTHER PUBLICATIONS

International Search Report of the International Searching Authority dated Aug. 5, 2014 for the corresponding international application No. PCT/JP2014/003149 (and English translation).
(Continued)

*Primary Examiner* — Steve R Young
(74) *Attorney, Agent, or Firm* — Posz Law Group, PLC

(57) ABSTRACT

A bridging apparatus includes an address-table managing unit configured to manage an address table in which devices connected to networks are registered, a presence-check-frame transmission control unit configured to transmit a presence check frame for checking whether a device is connected to a network, and a network transmission-reception control unit configured to call, upon receipt of a response request frame transmitted from a first device connected to a first network toward a second device connected to a second network, the address-table managing unit to register the first device in the address table and check whether the second device is registered in the address table, and when the second device is registered, transmit an acknowledgement to the first device and transfer the response request frame to the second network, whereas when the second device is not registered, instruct the pres-
(Continued)

ence-check-frame transmission control unit to transfer the response request frame to the second network.

4 Claims, 10 Drawing Sheets

(51) Int. Cl.
    *H04L 1/18*          (2006.01)
    *H04L 12/931*      (2013.01)
    *H04L 12/12*       (2006.01)
    *H04L 12/70*       (2013.01)

(52) U.S. Cl.
    CPC ............ *H04L 1/1887* (2013.01); *H04L 12/12* (2013.01); *H04L 12/46* (2013.01); *H04L 12/4616* (2013.01); *H04L 12/4625* (2013.01); *H04L 49/00* (2013.01); *H04L 2012/5685* (2013.01)

(56) References Cited

U.S. PATENT DOCUMENTS

| | | | |
|---|---|---|---|
| 6,577,630 B1* | 6/2003 | Markwalter | H04L 12/462 370/392 |
| 6,597,699 B1* | 7/2003 | Ayres | H04L 47/10 370/400 |
| 2004/0153520 A1* | 8/2004 | Rune | H04L 12/4616 709/206 |
| 2005/0036500 A1* | 2/2005 | Rodeheffer | H04L 12/462 370/401 |
| 2007/0091871 A1* | 4/2007 | Taha | H04L 49/3009 370/352 |
| 2007/0274290 A1* | 11/2007 | Takahashi | H04L 12/4625 370/351 |
| 2008/0075089 A1* | 3/2008 | Evans | H04L 47/70 370/395.52 |
| 2009/0238179 A1* | 9/2009 | Samprathi | H04L 12/4625 370/389 |
| 2011/0225312 A1* | 9/2011 | Liu | H04L 12/18 709/231 |
| 2013/0128726 A1* | 5/2013 | Hellhake | H04W 40/02 370/225 |
| 2013/0194964 A1 | 8/2013 | Basso et al. | |
| 2014/0177641 A1* | 6/2014 | Kalkunte | H04L 45/00 370/401 |

FOREIGN PATENT DOCUMENTS

JP       07-177171 A     7/1995
JP     2008-193183 A     8/2008

OTHER PUBLICATIONS

Office Action dated Jul. 18, 2017 issued in corresponding JP application No. 2016-527496 (and English translation).

* cited by examiner

FIG. 1
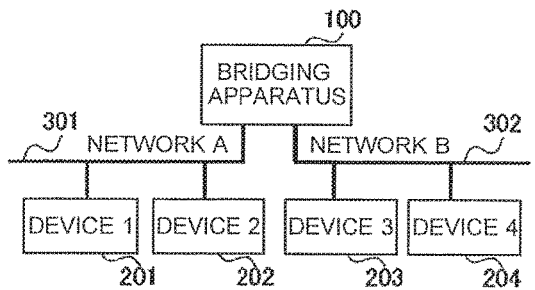
FIG. 2
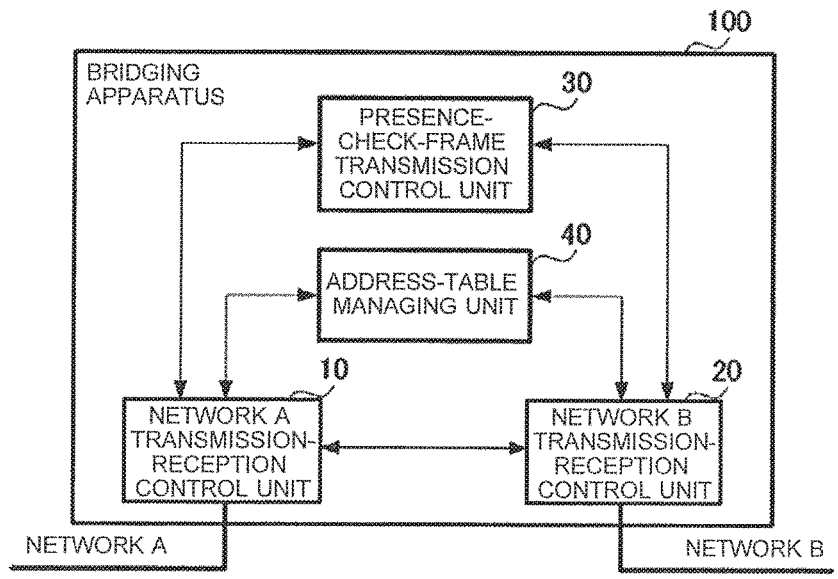
FIG. 3
| ADDRESS | NETWORK I/F | AGING TIME |
|---|---|---|
| 1 | A | 46 MINUTES 50 SECONDS |
| 2 | A | 2 MINUTES 00 SECONDS |
| 3 | B | 0 MINUTES 14 SECONDS |
| 4 | B | 59 MINUTES 34 SECONDS |
| ⋮ | ⋮ | ⋮ |

BRIDGING APPARATUS

CROSS REFERENCE TO RELATED APPLICATION

This application is a U.S. national stage application of PCT/JP2014/003149 filed on Jun. 13, 2014, the contents of which are incorporated herein by reference.

TECHNICAL FIELD

The present invention relates to a bridging apparatus used in a facility-based network.

BACKGROUND ART

In the field called facility-based networks, a network using band-sharing transmission media has been conventionally used. These band-sharing transmission media generally have a very narrow band, but still continue to be used today in various types of facility equipment, because of advantages in cost, operation, and connectivity with existing devices.

To expand a facility-based network by connecting a plurality of devices, a bridging apparatus is generally used. By using the bridging apparatus, terminals that are connected to physically different networks can communicate with each other without paying attention to the presence of the bridging apparatus. Using the bridging apparatus also allows distribution of traffic.

A conventional bridging apparatus connected to a network checks for the presence of terminals on the network by using a response from each of the terminals to periodic broadcasting (Patent Literature 1). Another conventional bridging apparatus connected to a network checks for the presence of terminals on the network by polling each of the terminals (Patent Literature 2).

CITATION LIST

Patent Literature

Patent Literature 1: Japanese Unexamined Patent Application Publication No. 05-53953
Patent Literature 2: Japanese Unexamined Patent Application Publication No. 04-081042

SUMMARY OF INVENTION

Technical Problem

A conventional bridging apparatus connected to a network consumes a communication band in traffic that is used to check for the presence of terminals on the network, causing a negative impact on normal communication between terminals. In a network configuration including a plurality of bridging apparatuses, in particular, the impact on normal communication between terminals is more significant.

Solution to Problem

A bridging apparatus according to one embodiment of the present invention includes an address-table managing unit configured to manage an address table in which devices connected to networks are registered, a presence-check-frame transmission control unit configured to transmit a presence check frame for checking whether a device is connected to a network, and a network transmission-reception control unit configured to call, upon receipt of a response request frame transmitted from a first device connected to a first network toward a second device connected to a second network, the address-table managing unit to register the first device in the address table and check whether the second device is registered in the address table, and when the second device is registered, transmit an acknowledgement to the first device and transfer the response request frame to the second network, whereas when the second device is not registered, instruct the presence-check-frame transmission control unit to transfer the response request frame to the second network.

Advantageous Effects of Invention

One embodiment of the present invention can check for the presence of a terminal with a small volume of traffic.

BRIEF DESCRIPTION OF DRAWINGS

FIG. 1 illustrates a network configuration according to Embodiment 1 of the present invention.

FIG. 2 illustrates a module configuration of a bridging apparatus 100 according to Embodiment 1 of the present invention.

FIG. 3 illustrates a terminal address table managed by an address-table managing unit 40 according to Embodiment 1 of the present invention.

DESCRIPTION OF EMBODIMENTS

Embodiment 1

Figure 4:
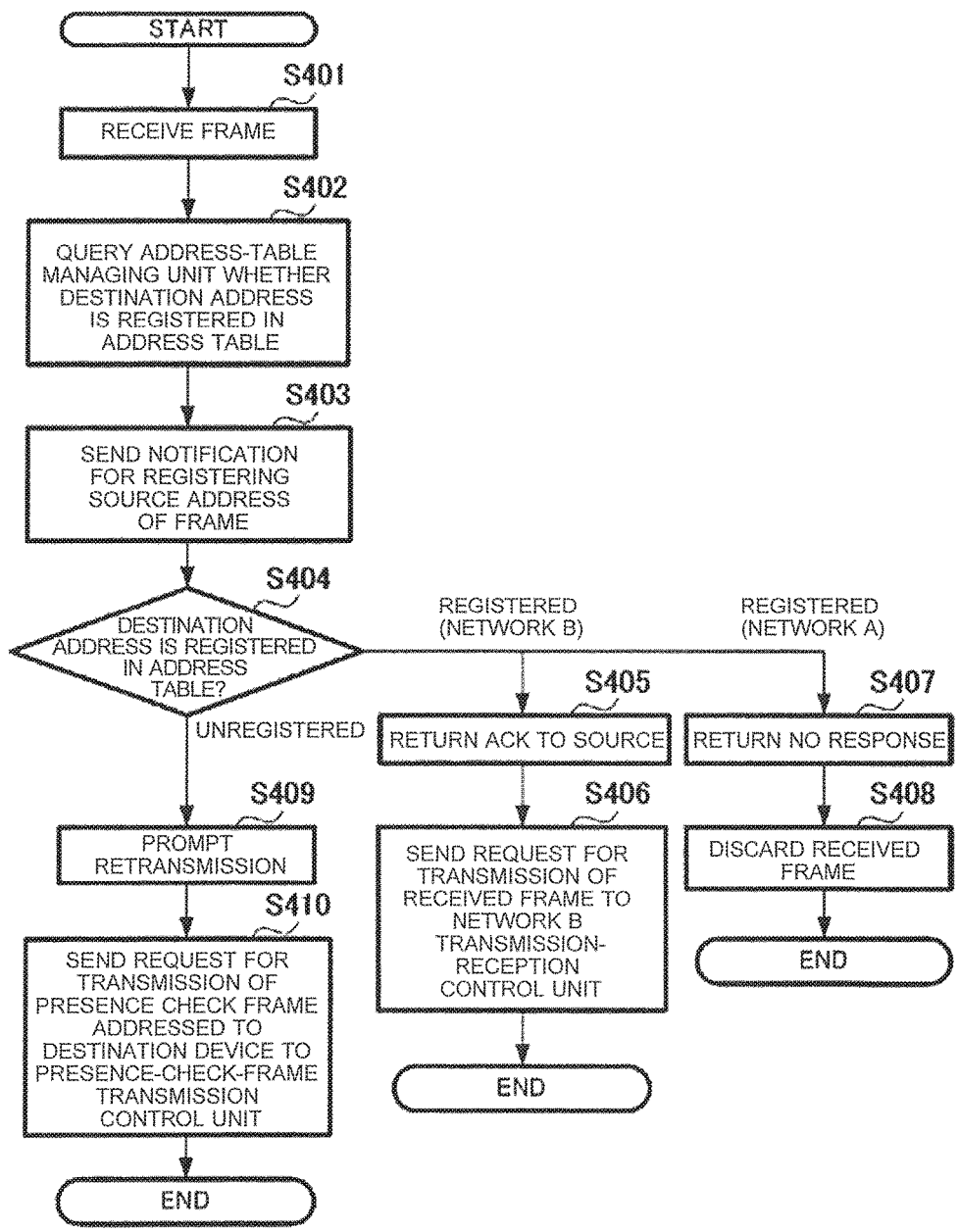
FIG. 4 illustrates a flow of processing performed when a network A transmission-reception control unit 10 according to Embodiment 1 of the present invention receives a frame from a network A 301.

A network configuration according to Embodiment 1 is illustrated in FIG. 1. In the example of FIG. 1, a device 1 (201), a device 2 (202), and a bridging apparatus 100 are connected to a network A 301, and a device 3 (203), a device 4 (204), and the bridging apparatus 100 are connected to a network B 302.

FIG. 2 illustrates a module configuration of the bridging apparatus 100 according to Embodiment 1.

The bridging apparatus 100 includes a network A transmission-reception control unit 10, a network B transmission-reception control unit 20, a presence-check-frame transmission control unit 30, and an address-table managing unit 40.

The network A transmission-reception control unit 10 is an interface for the network A 301 allowing a connection of a multi-drop connection of the bridging apparatus 100.

The network B transmission-reception control unit 20 is an interface for the network B 302 allowing a connection of the multi-drop connection of the bridging apparatus 100.

The presence-check-frame transmission control unit 30 receives, from either of the network A transmission-reception control unit 10 and the network B transmission-reception control unit 20, a request to transmit a presence check frame to a specified destination and a network.

Upon receipt of the request to transmit a presence check frame, the presence-check-frame transmission control unit 30 generates a presence check frame. Then, the presence-check-frame transmission control unit 30 requests the specified network A transmission-reception control unit 10 or network B transmission-reception control unit 20 to transmit the generated presence check frame.

The presence check frame used may be one that is defined in the specified network.

The address-table managing unit 40 manages the addresses of terminals connected to networks.

The address-table managing unit 40 receives, from either of the network A transmission-reception control unit 10 and the network B transmission-reception control unit 20, a request to register a specified address and an inquiry as to whether a specified address is registered.

A terminal address table managed by the address-table managing unit 40 is illustrated in FIG. 3. An address 410, a network I/F 420, and an aging time 430 are registered in the address table.

The operation of the bridging apparatus 100 will be described below with reference to FIGS. 4 to 9.

First, a process performed when the bridging apparatus 100 receives a frame from a network will be described. FIG. 4 is a flowchart illustrating a process performed when the network A transmission-reception control unit 10 of the bridging apparatus 100 receives a frame from the network A 301.

For example, when the device 1 (201) transmits a frame addressed to the device 4 (204) in the network configuration illustrated in FIG. 1, the network A transmission-reception control unit 10 receives the frame from the network A 301 (S401). For example, the frame transmitted from the device 1 (201) is assumed to be received by the network A transmission-reception control unit 10.

The network A transmission-reception control unit 10 queries the address-table managing unit 40 as to whether the destination address of the received frame is registered in the address table (S402).

Additionally, the network A transmission-reception control unit 10 sends a notification for registering the source address of the received frame to the address-table managing unit 40 (S403).

The network A transmission-reception control unit 10 may query the address-table managing unit 40 as to whether the destination address of the received frame is registered in the address table (S402) after the network A transmission-reception control unit 10 sends a notification for registering the source address of the received frame to the address-table managing unit 40 (S403).

Figure 5:
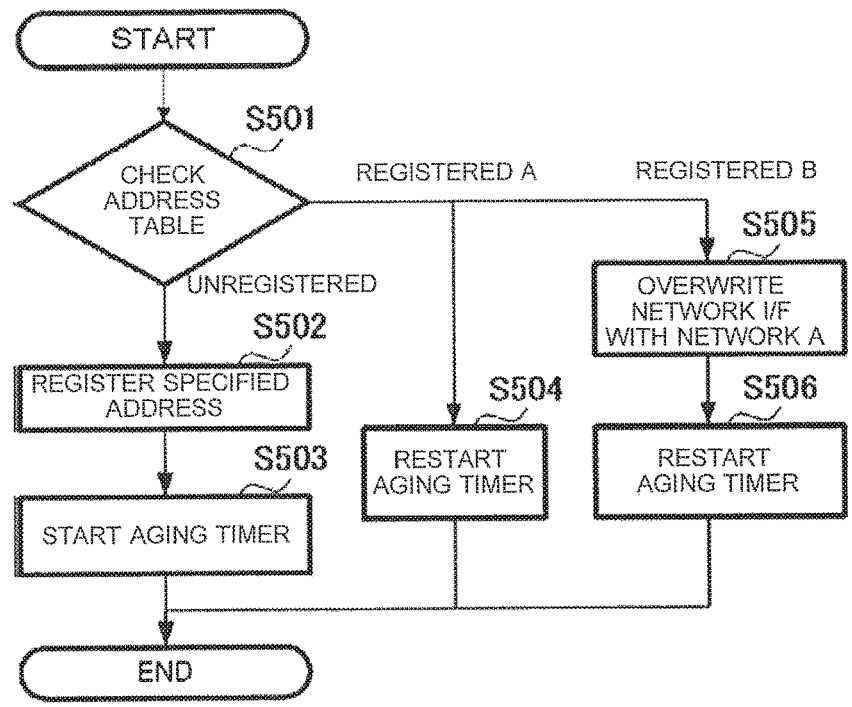
FIG. 5 illustrates a flow of processing performed when the address-table managing unit 40 according to Embodiment 1 of the present invention receives a registration request.

A flow of processing performed when the address-table managing unit 40 receives a registration request from the network A transmission-reception control unit 10 is illustrated in FIG. 5.

Upon receipt of a request to register an address is specified from the network A transmission-reception control unit 10, the address-table managing unit 40 checks whether the specified address is registered in the address table (S501).

When the address specified by the network A transmission-reception control unit 10 is not registered in the address table (UNREGISTERED in S501), the address-table managing unit 40 registers the specified address for the network A 301 (S502).

The registration in the address table illustrated in FIG. 3 involves storing the specified address in the address 410, storing the letter "A" in the network I/F 420 (in the case of Embodiment 1), and storing a preset maximum aging time (e.g., 60 minutes) in the aging time 430.

Then, the address-table managing unit 40 starts an aging timer (S503). The address-table managing unit 40 deletes information related to an address for which the aging timer has reached the timeout.

When the address specified by the network A transmission-reception control unit 10 is registered in the address table as an address for the network A (REGISTERED A in S501), the address-table managing unit 40 resets the aging time 430 for the corresponding address to the preset maximum aging time (e.g., 60 minutes) and restarts the aging timer (S504).

When the address specified by the network A transmission-reception control unit 10 is registered in the address table as an address for the network B (REGISTERED B in S501), the address-table managing unit 40 overwrites the network I/F 420 for the corresponding address with the network A (S505).

Then, the address-table managing unit 40 resets the aging time 430 for the corresponding address to the preset maximum aging time (e.g., 60 minutes) and restarts the aging timer (S506).

Figure 6:
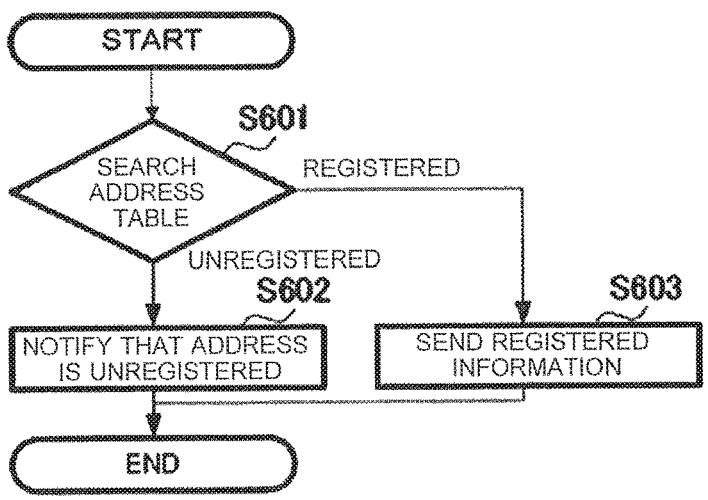
FIG. 6 illustrates a flow of the address-table managing unit 40 according to Embodiment 1 of the present invention.

FIG. 6 illustrates a flow of processing performed when the address-table managing unit 40 is queried as to whether the destination address of the frame received from the network A transmission-reception control unit 10 is registered in the address table.

The address-table managing unit 40 searches the address table, and when the address specified by the network A transmission-reception control unit 10 is not registered (UN-REGISTERED in S601), the address-table managing unit 40 notifies the network A transmission-reception control unit 10 that the specified address is unregistered (S602).

The address-table managing unit 40 searches the address table, and when the address specified by the network A transmission-reception control unit 10 is registered (REGISTERED in S601), the address-table managing unit 40 sends the corresponding network I/F information to the network A transmission-reception control unit 10 (S603).

The description below will return to the flowchart of FIG. 4.

When the network A transmission-reception control unit 10 finds, by referring to the information sent from the address-table managing unit 40, that the destination address of the received frame is already registered for the network B 302 (REGISTERED (NETWORK B) in S404), the network A transmission-reception control unit 10 returns an acknowledgement (ACK) to the source device (S405).

Then, the network A transmission-reception control unit 10 sends a request for transmission of the received frame to the network B transmission-reception control unit 20 (S406).

Figure 7:
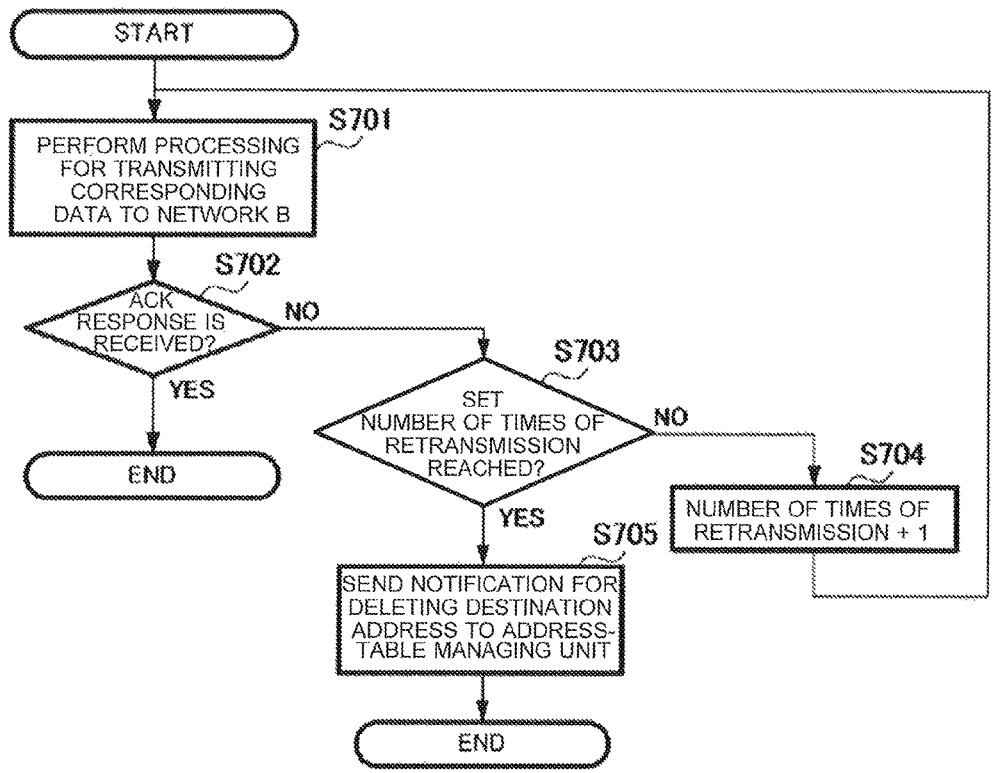
FIG. 7 illustrates a flow of processing performed when a network B transmission-reception control unit 20 according to Embodiment 1 of the present invention receives a request to transmit a received frame from the network A transmission-reception control unit 10.

FIG. 7 illustrates a flow of processing performed when the network B transmission-reception control unit 20 receives a request to transmit a received frame from the network A transmission-reception control unit 10.

Upon receipt of a request to transmit a received frame from the network A transmission-reception control unit 10, the network B transmission-reception control unit 20 performs processing for transmitting the corresponding data to the network B 302 (S701).

When an ACK response has been received from the destination (device) after frame transmission (YES in S702), the network B transmission-reception control unit 20 ends the processing.

When no ACK response has been received (NO in S702), the network B transmission-reception control unit 20 checks whether the number of times of retransmission has reached a preset value (S703).

When the number of times of retransmission has not reached the preset value (NO in S703), the network B transmission-reception control unit 20 adds one to the number of times of retransmission (S704), and performs processing for transmitting the corresponding data to the network B 302 again (S701).

When the number of times of retransmission has reached the preset value (YES in S703), that is, when no ACK has been received even though the retransmission processing has been repeated the preset number of times, the network B transmission-reception control unit 20 sends a notification for deleting the destination address to the address-table managing unit 40 (S705).

Figure 8:
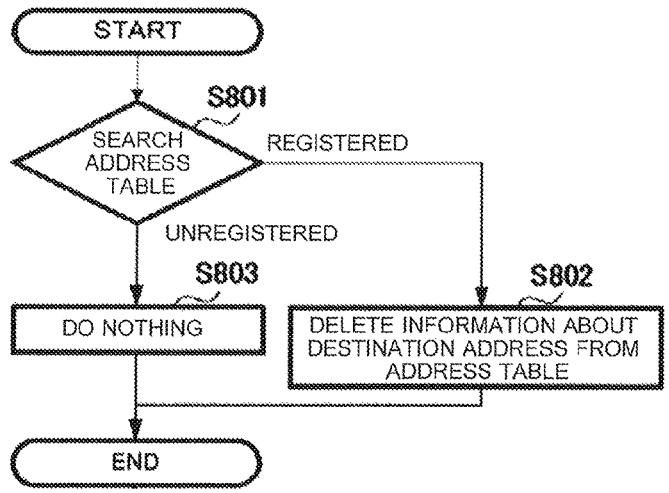
FIG. 8 illustrates a flow of processing performed when the address-table managing unit 40 according to Embodiment 1 of the present invention receives an address deletion notification from the network B transmission-reception control unit 20.

FIG. 8 illustrates a flow of processing performed when the address-table managing unit 40 receives an address deletion notification from the network B transmission-reception control unit 20.

Upon receipt of a notification for deleting a destination address from the network B transmission-reception control unit 20, the address-table managing unit 40 searches the address table (S801).

When the address-table managing unit 40 searches the address table and finds that the destination address is registered (REGISTERED in S801), the address-table managing unit 40 deletes information related to the destination address from the address table (S802).

When the address-table managing unit 40 searches the address table and finds that the destination address is not registered (UNREGISTERED in S801), the address-table managing unit 40 does nothing (S803).

The description below will return to FIG. 4.

When the network A transmission-reception control unit 10 finds, by referring to the information sent from the address-table managing unit 40, that the destination address of the received frame is already registered for the network A 301 (REGISTERED (NETWORK A) in S404), the network A transmission-reception control unit 10 returns no response to the source device (S407).

Then, the network A transmission-reception control unit 10 discards the received frame (S408).

When the network A transmission-reception control unit 10 finds, by referring to the information sent from the address-table managing unit 40, that the destination address of the received frame is not registered (UNREGISTERED in S404), the network A transmission-reception control unit 10 prompts the source device to retransmit a response request frame (S409).

For example, the network A transmission-reception control unit 10 may transmit, to the source device, a response frame addressed to the source device and having a specific bit set to one.

The network A transmission-reception control unit 10 then sends, to the presence-check-frame transmission control unit 30, a request to transmit a presence check frame addressed to the destination device (S410).

Although the operation in S409 precedes the operation in S410 in Embodiment 1, the operation in S410 may precede the operation in S409. The operation in S409 may be skipped and only the operation in S410 may be performed.

Upon receipt of the request, from the network A transmission-reception control unit 10, for a presence check frame, the presence-check-frame transmission control unit 30 generates a presence check frame and sends a transmission request to the network B transmission-reception control unit 20.

The presence check frame generated by the presence-check-frame transmission control unit 30 may be a presence check frame defined in a network, such as a unit attribute request frame used in an air-conditioning network.

Figure 9:
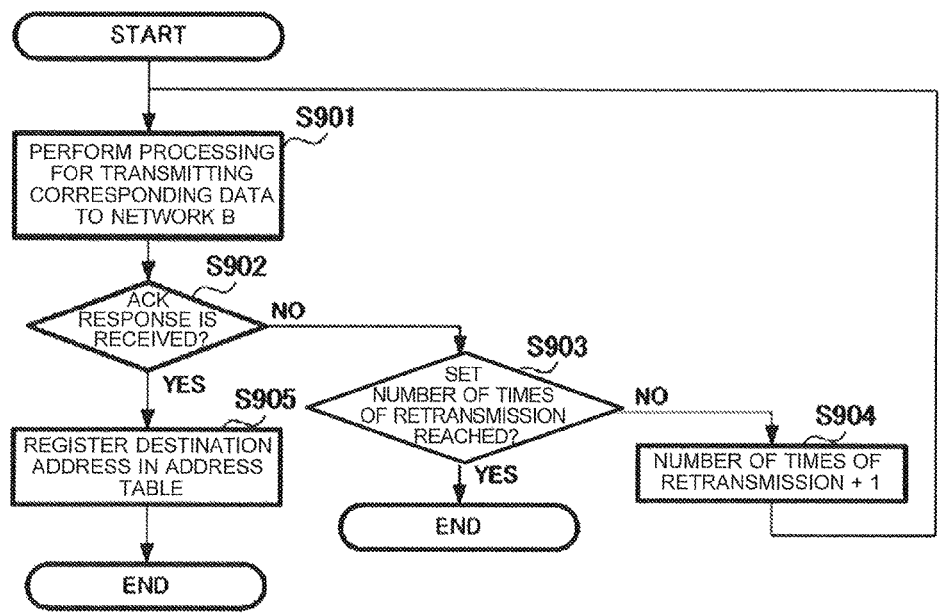
FIG. 9 illustrates a flow of processing performed when the network B transmission-reception control unit 20 according to Embodiment 1 of the present invention receives a transmission request from the presence-check-frame transmission control unit 30.

FIG. 9 illustrates a flow of processing performed when the network B transmission-reception control unit 20 receives a transmission request from the presence-check-frame transmission control unit 30.

When a transmission request is received from the presence-check-frame transmission control unit 30, the network B transmission-reception control unit 20 performs processing for transmitting the corresponding data to the network B 302 (S901).

The network B transmission-reception control unit 20 checks whether an ACK response has been received (S902). When no ACK response has been received (NO in S902), the network B transmission-reception control unit 20 checks whether the number of times of retransmission has reached a set value (S903).

When the number of times of retransmission has not reached the set value (NO in S903), the network B transmission-reception control unit 20 adds one to the number of times of retransmission (S904), and performs retransmission processing (S901).

When the number of times of retransmission has reached the set value (YES in S903), that is, when no ACK has been received even though the retransmission has been repeated a specified number of times, the network B transmission-reception control unit 20 ends the processing.

When an ACK response has been received (YES in S902), the network B transmission-reception control unit 20 sends a notification for registering the destination address to the address-table managing unit 40 (S905).

Figure 10:
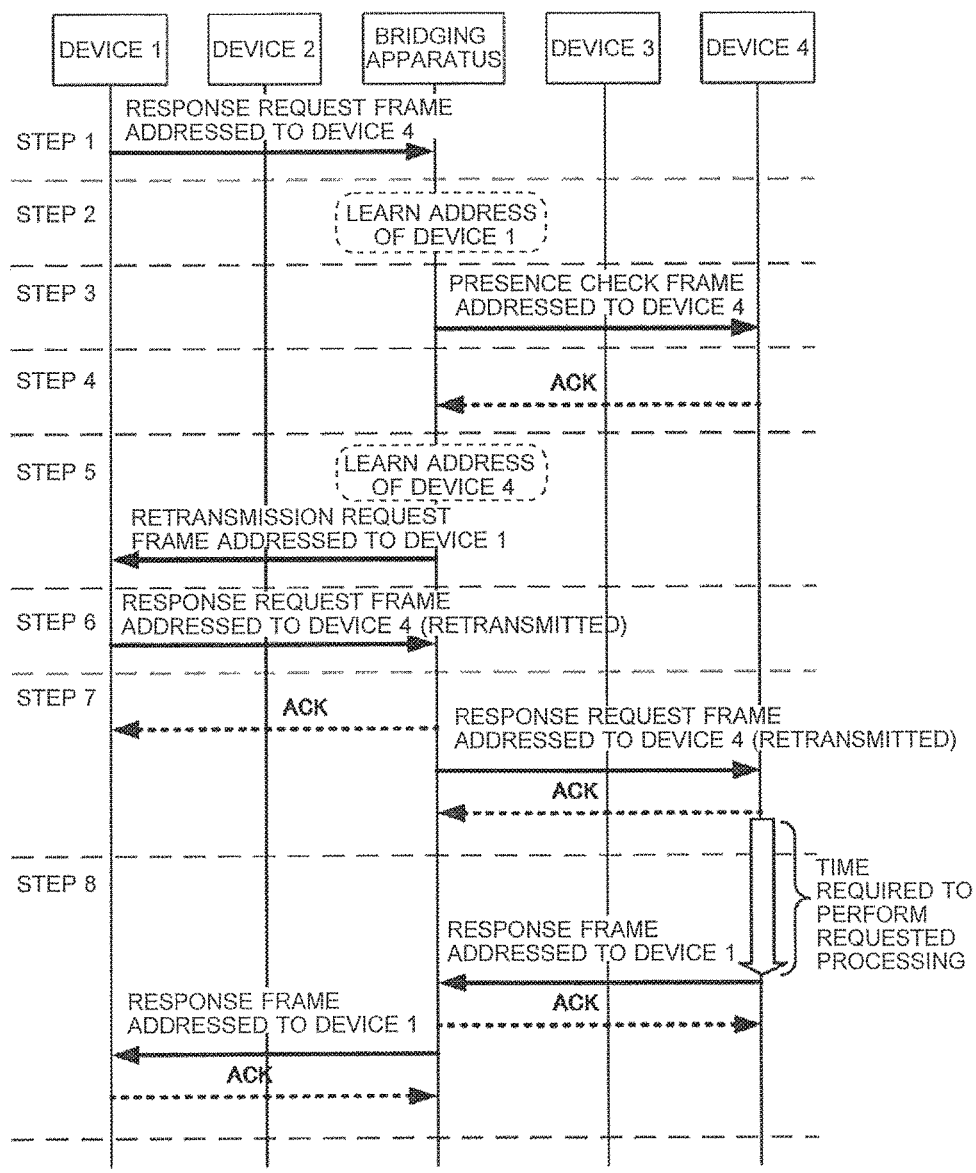
FIG. 10 illustrates a communication sequence from a device 1 (201) to a device 4 (204) according to Embodiment 1 of the present invention.

A communication sequence from the device 1 (201) to the device 4 (204) will be described with reference to FIG. 10. Note that the device 1 (201), the device 4 (204), and the bridging apparatus 100 are included in the same network configuration as that described with reference to FIG. 1.

This example assumes that the addresses of the device 1 (201) and the device 4 (204) are not registered in the address table of the bridging apparatus 100.

Step 1 For sending a frame addressed to the device 4 (204), the device 1 (201) transmits the frame to the network A 301.

Step 2

The bridging apparatus 100 receives the frame addressed to the device 4 (204) and transmitted by the device 1 (201).

The bridging apparatus 100 checks whether the address of the device 4 (204) is registered in the address table.

Since the address of the device 4 (204) is not registered, the bridging apparatus 100 discards the received frame. The bridging apparatus 100 returns no ACK response to the device 1 (201).

The bridging apparatus 100 registers the address of the device 1 (201) in the address table and learns the corresponding information.

Step 3

Since the address of the device 4 (204) is not registered in the address table, the bridging apparatus 100 transmits, to the network B 302, a presence check frame addressed to the device 4 (204).

Step 4

The device 4 (204) receives the presence check frame from the bridging apparatus 100 and returns an ACK response.

Step 5

Upon receipt of the ACK response from the device 4 (204), the bridging apparatus 100 registers the device 4 (204) in the address table.

The bridging apparatus 100 sends a retransmission request frame addressed to the device 1 (201).

Step 6

Upon receipt of the retransmission request frame sent from the bridging apparatus in step 5, the device 1 (201) transmits a response request frame addressed to the device 4 (204) again (i.e., performs retransmission processing).

Even when the bridging apparatus 100 does not send the retransmission request frame addressed to the device 1 (201) in step 5, the device 1 (201) transmits a response request frame addressed to the device 4 (204) again, because no response (ACK) to the response request frame addressed to the device 4 (204) and transmitted in step 1 has been received from the device 4 (204).

Step 7

The bridging apparatus 100 receives the frame addressed to the device 4 (204) and retransmitted in step 6.

The bridging apparatus 100 checks whether the address of the device 4 (204) is registered in the address table.

Since the address of the device 4 (204) is registered this time, the bridging apparatus 100 returns an ACK response to the device 1 (201), which is the source device.

At the same time, the bridging apparatus 100 relays the response request frame addressed to the device 4 (204) and received from the device 1 (201), and transmits the frame to the device 4 (204).

The device 4 (204) transmits, to the device 1 (201), a response (ACK) to the response request frame sent from the device 1 (201), and executes the requested processing.

Step 8

The device 4 (204) transmits, to the network B 302, a response frame addressed to the device 1 (201).

The bridging apparatus 100 receives the response frame addressed to the device 1 (201) and transmitted by the device 4 (204).

The bridging apparatus 100 checks whether the address of the device 1 (201) is registered in the address table.

Since the address of the device 1 (201) is registered, the bridging apparatus 100 returns an ACK response to the device 4 (204), which is the source device of the response frame addressed to the device 1 (201).

At the same time, the bridging apparatus 100 transmits, to the network A 301, the response frame addressed to the device 1 (201) and received from the device 4 (204).

The device 1 (201) receives the response frame addressed to the device 1 (201) and transmitted by the device 4 (204), and returns a response (ACK).

Although the network A transmission-reception control unit 10 has been primarily described to explain the processing in Embodiment 1, the same applies to the network B transmission-reception control unit 20. In Embodiment 1, the bridging apparatus 100 is connected to two networks, the network A 301 and the network B 302. However, the bridging apparatus 100 may be connected to three or more networks, as long as the bridging apparatus 100 includes network transmission-reception control units that correspond to the individual networks.

As described above, the bridging apparatus 100 includes the address-table managing unit 40 configured to check whether a device is registered in the address table, the presence-check-frame transmission control unit 30 configured to transmit a presence check frame for checking whether a device is connected to a network, and a network transmission-reception control unit configured to check, when a device transmits a response request frame addressed to another device, whether the destination device is registered in the address table, and when the destination device is registered, transmit an ACK to the source device and also transmit the response request frame to a network to which the destination device is connected, whereas when the destination device is not registered, query the presence-check-frame transmission control unit 30, without transmitting an ACK to the source device, as to whether the destination device is present on a network different from a network to which the source device is connected and register the source device in the address table. Thus, address information of a device on a network can be learned without consuming the communication band of the network.

Embodiment 2

Embodiment 1 has described an example in which, when the bridging apparatus 100 receives from a source device a response request frame addressed to a destination device connected to a different network and the destination device is not registered in the address table, a presence check frame for checking for the presence of the destination device is transmitted by the presence-check-frame transmission control unit 30.

Embodiment 2 will describe the case where the presence-check-frame transmission control unit 30 uses a response request frame transmitted from a source device, instead of a presence check frame used for checking for the presence of a device not registered in the address table.

The module configuration of the bridging apparatus 100 according to Embodiment 2 is the same as that in Embodiment 1.

Figure 11:
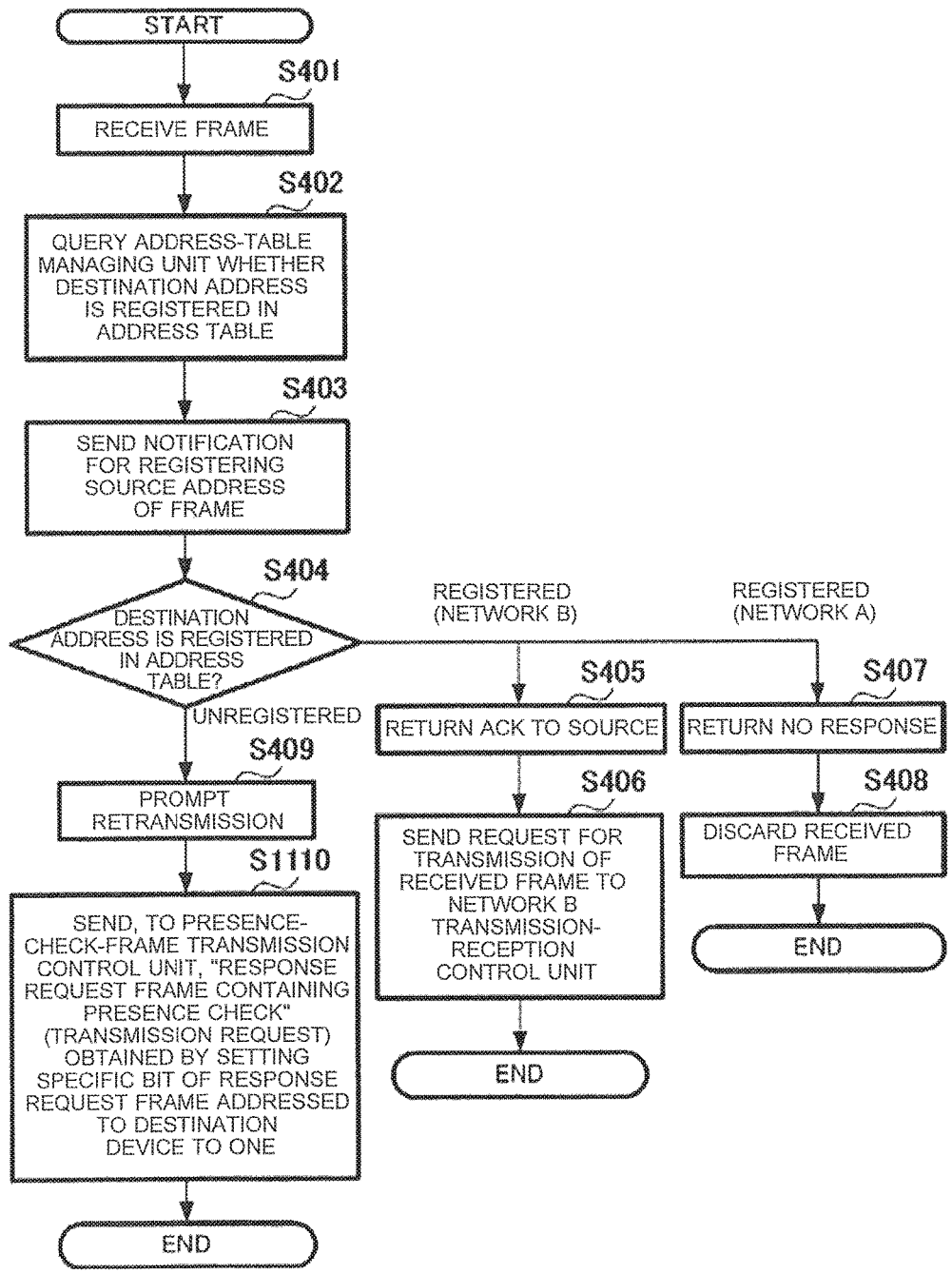
FIG. 11 illustrates a flow of processing performed when the network A transmission-reception control unit 10 according to Embodiment 2 of the present invention receives a frame from the network A 301.
Figure 12:
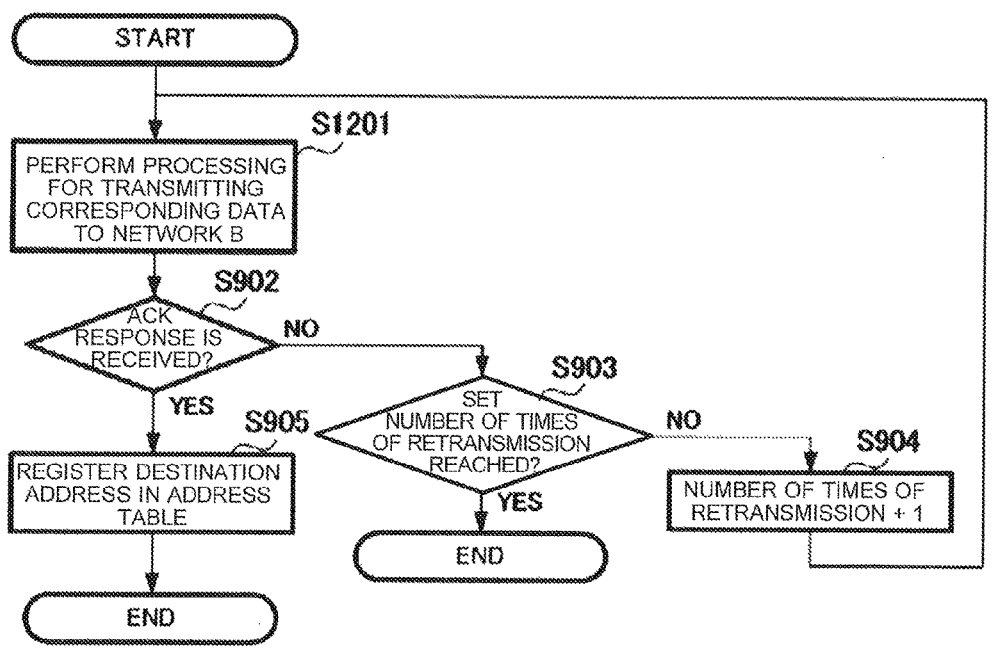
FIG. 12 illustrates a flow of processing performed when the network B transmission-reception control unit 20 according to Embodiment 2 of the present invention receives a transmission request from the presence-check-frame transmission control unit 30.

The operation of the bridging apparatus 100 in Embodiment 2 is substantially the same as that in Embodiment 1. FIG. 11 illustrates a flow of processing performed when the network A transmission-reception control unit 10 receives a frame from the network A 301. FIG. 12 illustrates a flow of processing performed when the network B transmission-reception control unit 20 receives a transmission request from the presence-check-frame transmission control unit 30. The processes illustrated in FIGS. 11 and 12 partly differ from those in Embodiment 1.

In FIG. 11, steps S401 to S409 are the same as those described with reference to FIG. 4 in Embodiment 1. The network A transmission-reception control unit 10 sends, to the presence-check-frame transmission control unit 30, a request to transmit a response request frame containing a presence check. The response request frame is obtained by setting a specific bit of a response request frame addressed to a destination device to one (S1110).

In FIG. 12, when a transmission request is received from the presence-check-frame transmission control unit 30, the network B transmission-reception control unit 20 performs processing for transmitting the corresponding data to the network B 302 (S1201).

The network B transmission-reception control unit 20 checks whether an ACK response has been received (S902). When no ACK response has been received (NO in S902), the network B transmission-reception control unit 20 checks whether the number of times of retransmission has reached a set value (S903).

When the number of times of retransmission has not reached the set value (NO in S903), the network B transmission-reception control unit 20 adds one to the number of times of retransmission (S904), and performs retransmission processing (S1201).

When an ACK response has been received (YES in S902), the network B transmission-reception control unit 20 sends a notification for registering the destination address to the address-table managing unit 40 (S905).

Figure 13:
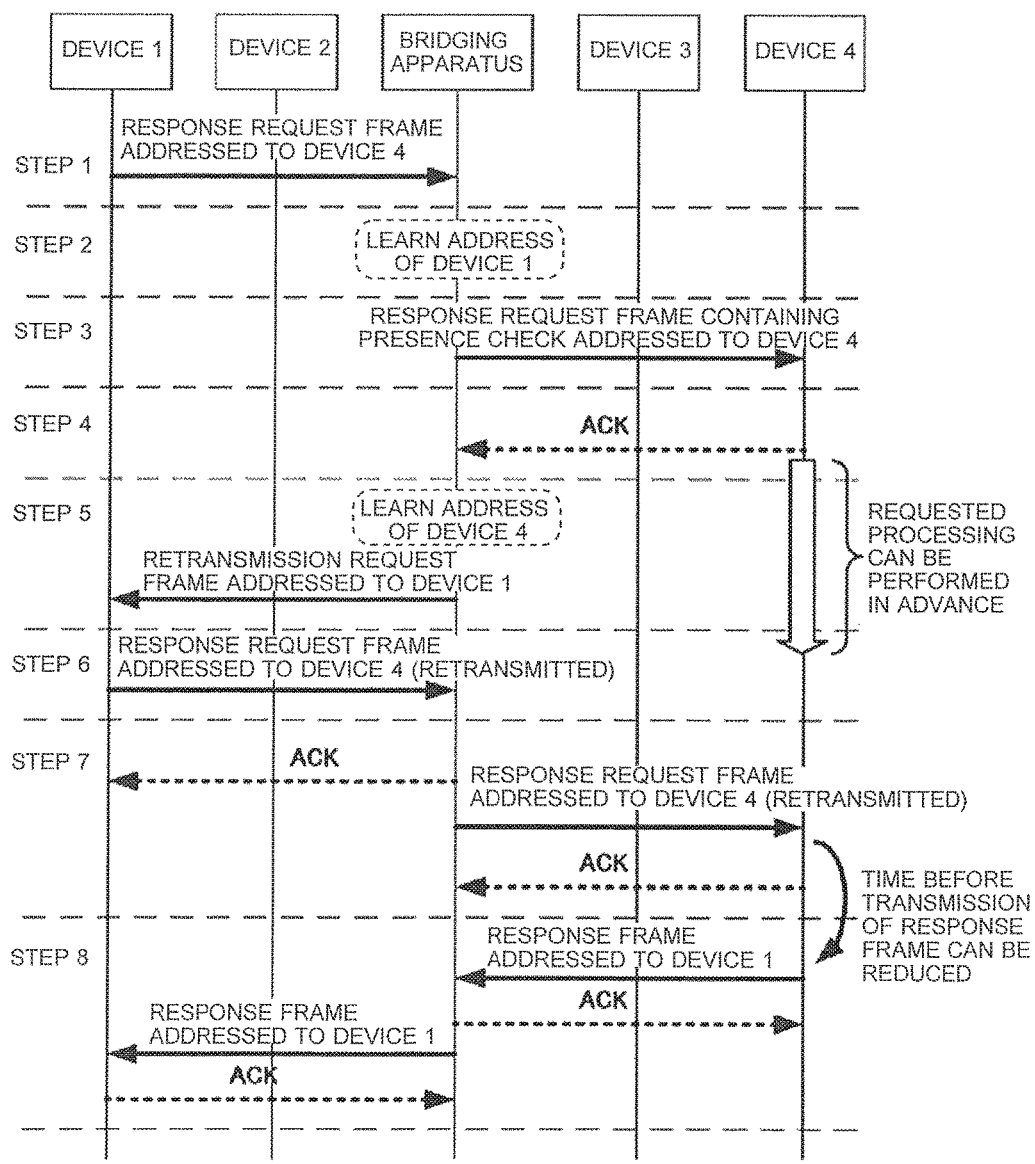
FIG. 13 illustrates a communication sequence from the device 1 (201) to the device 4 (204) according to Embodiment 2 of the present invention.

A communication sequence from the device 1 (201) to the device 4 (204) will be described with reference to FIG. 13. Note that the device 1 (201), the device 4 (204), and the bridging apparatus 100 are included in the same network configuration as that described with reference to FIG. 1.

This example assumes that the addresses of the device 1 (201) and the device 4 (204) are not registered in the address table of the bridging apparatus 100.

Step 1

For sending a frame addressed to the device 4 (204), the device 1 (201) transmits the frame to the network A 301.

Step 2

The bridging apparatus 100 receives the frame addressed to the device 4 (204) and transmitted by the device 1 (201).

The bridging apparatus 100 checks whether the address of the device 4 (204) is registered in the address table.

Since the address of the device 4 (204) is not registered, the bridging apparatus 100 discards the received frame. The bridging apparatus 100 returns no ACK response to the device 1 (201).

The bridging apparatus 100 registers the address of the device 1 (201) in the address table and learns the corresponding information.

Step 3

Since the address of the device 4 (204) is not registered in the address table, the bridging apparatus 100 transmits, to the network B 302, a presence check frame addressed to the device 4 (204).

Step 4

The device 4 (204) receives the presence check frame from the bridging apparatus 100, returns an ACK response, and executes the requested processing.

Step 5

Upon receipt of the ACK response from the device 4 (204), the bridging apparatus 100 registers the device 4 (204) in the address table.

The bridging apparatus 100 sends a retransmission request frame addressed to the device 1 (201).

Step 6

Upon receipt of the retransmission request frame sent from the bridging apparatus in step 5, the device 1 (201) transmits a response request frame addressed to the device 4 (204) again (i.e., performs retransmission processing).

Even when the bridging apparatus 100 does not send the retransmission request frame addressed to the device 1 (201) in step 5, the device 1 (201) transmits a response request frame addressed to the device 4 (204) again, because no response (ACK) to the response request frame addressed to the device 4 (204) and transmitted in step 1 has been received from the device 4 (204).

Step 7

The bridging apparatus 100 receives the frame addressed to the device 4 (204) and retransmitted in step 6.

The bridging apparatus 100 checks whether the address of the device 4 (204) is registered in the address table.

Since the address of the device 4 (204) is registered this time, the bridging apparatus 100 returns an ACK response to the device 1 (201), which is the source device.

At the same time, the bridging apparatus 100 relays the response request frame addressed to the device 4 (204) and received from the device 1 (201), and transmits the frame to the device 4 (204).

The device 4 (204) transmits, to the device 1 (201), a response (ACK) to the response request frame sent from the device 1 (201).

Step 8

The device 4 (204) transmits, to the network B 302, a response frame addressed to the device 1 (201).

Unlike in the case of Embodiment 1, the requested processing has been executed in advance in step 4 in Embodiment 2. Consequently, the waiting time for completion of the processing can be shorter than in Embodiment 1.

The bridging apparatus 100 receives the response frame addressed to the device 1 (201) and transmitted by the device 4 (204).

The bridging apparatus 100 checks whether the address of the device 1 (201) is registered in the address table.

Since the address of the device 1 (201) is registered, the bridging apparatus 100 returns an ACK response to the device 4 (204), which is the source device of the response frame addressed to the device 1 (201).

At the same time, the bridging apparatus 100 transmits, to the network A 301, the response frame addressed to the device 1 (201) and received from the device 4 (204).

The device 1 (201) receives the response frame addressed to the device 1 (201) and transmitted by the device 4 (204), and returns a response (ACK).

Although the network A transmission-reception control unit 10 has been primarily described to explain the processing in Embodiment 2, the same applies to the network B transmission-reception control unit 20. In Embodiment 2, the bridging apparatus 100 is connected to two networks, the network A 301 and the network B 302. However, the bridging apparatus 100 may be connected to three or more networks, as long as the bridging apparatus 100 includes network transmission-reception control units that correspond to the individual networks.

As described above, the bridging apparatus 100 includes the address-table managing unit 40 configured to check whether a device is registered in the address table, the presence-check-frame transmission control unit 30 configured to transmit a presence check frame for checking whether a device is connected to a network, and a network transmission-reception control unit configured to check, when a device transmits a response request frame to another device, whether the destination device is registered in the address table, and when the destination device is registered, transmit an ACK to the source device and also transmit the response request frame to a network to which the destination device is connected, whereas when the destination device is not registered, query the presence-check-frame transmission control unit 30, without transmitting an ACK to the source device, as to whether the destination device is present on a network different from a network to which the source device is connected and register the source device in the address table. Thus, address information of a device on a network can be learned without consuming the communication band of the network.

Also, when the bridging apparatus 100 receives, from the source device, a response request frame addressed to the destination device connected to the different network and the destination device is not registered in the address table, the bridging apparatus 100 sends, to the presence-check-frame transmission control unit 30, a request to transmit a response request frame containing a presence check. The response request frame is obtained by setting a specific bit of the response request frame transmitted from the source device to one, instead of the presence check frame for checking for the presence of the destination device. Consequently, the destination device can check the request to be sent in advance, thereby reducing the time before a response frame is transmitted in response to a retransmitted response request frame.

In Embodiment 2, a response request frame containing a presence check is obtained by setting a specific bit of a response request frame sent from the source device to one. Alternatively, depending on the type of data received, a response request frame and a presence check frame may be transmitted together.

Embodiment 3

Embodiments 1 and 2 have described examples in which, when a device on a network to which the bridging apparatus 100 is connected transmits a response request frame addressed to another device, the device that has transmitted the response request frame is registered in the address table.

Embodiment 3 will describe the case in which the address-table managing unit 40 regularly transmits address table information, as an address table information frame, to a different bridging apparatus, and receives an address table information frame transmitted from the different bridging apparatus.

The module configuration of the bridging apparatus 100 according to Embodiment 3 is the same as that in Embodiment 1 or 2.

The operation of the bridging apparatus 100 in Embodiment 3 is also the same as that in Embodiment 1 or 2. The processing of regularly transmitting an address table information frame to another bridging apparatus and the processing performed when the address table information frame is received are newly added in Embodiment 3.

As for the timing at which the bridging apparatus transmits the address table information frame, for example, the transmission may be periodically performed by starting the timer at predetermined intervals, or may be performed when a device is newly registered in the address table or when an address is deleted from the address table based on the aging timer.

Processing performed when the bridging apparatus 100 receives an address table information frame from another bridging apparatus will be described with reference to FIGS. 14 and 15.

Figure 14:
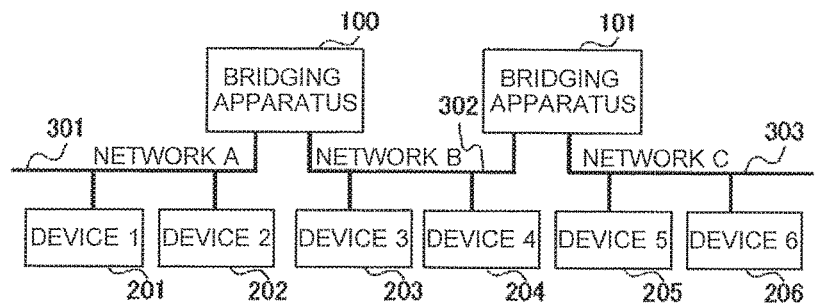
FIG. 14 illustrates a network configuration according to Embodiment 3 of the present invention.

FIG. 14 illustrates a network configuration according to Embodiment 3. The device 1 (201), the device 2 (202), and the bridging apparatus 100 are connected to the network A 301, the device 3 (203), the device 4 (204), the bridging apparatus 100, and a bridging apparatus 101 are connected to the network B 302, and a device 5 (205), a device 6 (206), and the bridging apparatus 101 are connected to a network C 303.

This example assumes that the device 1 (201) to the device 4 (204), which are connected to the network A 301 and network B 302 to which the bridging apparatus 100 is connected, are registered in the address table of the bridging apparatus 100, whereas the device 3 (203) to the device 6 (206), which are connected to the network B 302 and network C 303 to which the bridging apparatus 101 is connected, are registered in the address table of the bridging apparatus 101.

Figure 15:
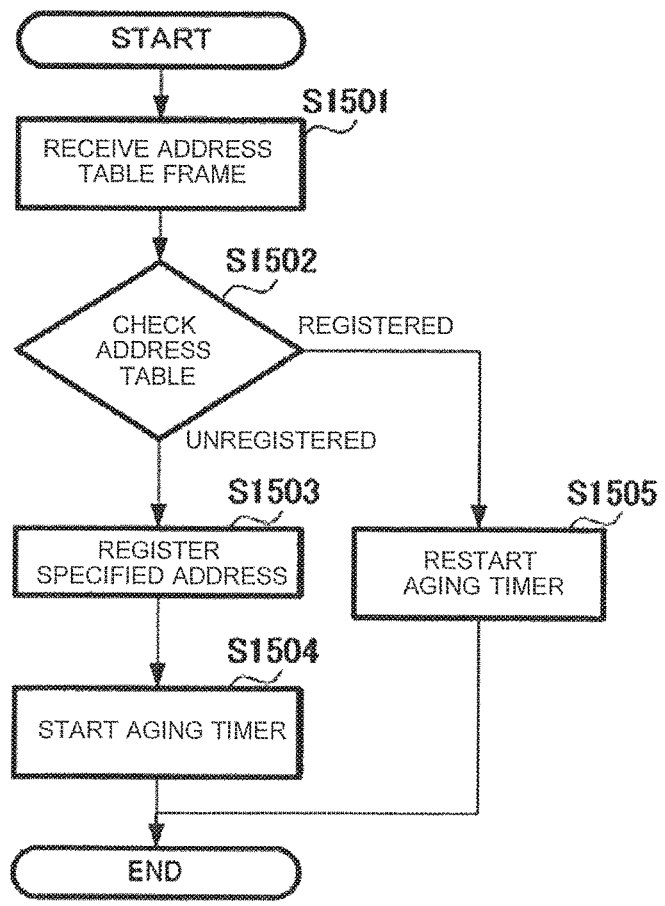
FIG. 15 illustrates a flow of processing performed when the network B transmission-reception control unit 20 according to Embodiment 3 of the present invention receives an address table information frame from another bridging apparatus 100 through the network B 302.

FIG. 15 illustrates a flow of processing performed when the bridging apparatus 100 receives an address table information frame from the bridging apparatus 101. In Embodiment 3, the bridging apparatus 100 receives an address table information frame from the bridging apparatus 101.

The network B transmission-reception control unit 20 of the bridging apparatus 100 receives, through the network B 302, an address table information frame output by the bridging apparatus 101 (S1501).

When an address specified by the network B transmission-reception control unit 20 of the bridging apparatus 100 is not registered in the address table (UNREGISTERED in S1502), the address-table managing unit 40 of the bridging apparatus 100 registers the specified address for the network B 302 (S1503).

The registration involves creating a new row in the address table described with reference to FIG. 3, storing the specified address in the address 410, storing the letter "B" in the network I/F 420 (in the case of Embodiment 3), and storing a preset maximum aging time (e.g., 60 minutes) in the aging time 430.

Then, the address-table managing unit 40 of the bridging apparatus 100 starts the aging timer (S1504).

When the address specified by the network B transmission-reception control unit 20 of the bridging apparatus 100 is registered in the address table as an address for the network B 302 or the network C 303 (REGISTERED in S1502), the address-table managing unit 40 of the bridging apparatus 100 resets the aging time 430 for the corresponding address to the preset maximum aging time (e.g., 60 minutes) and restarts the aging timer (S1505).

As described above, a bridging apparatus transmits its address table information as an address table information frame to a different bridging apparatus and receives an address table information frame from a different bridging apparatus, thereby receiving address table information owned by the different bridging apparatus. Thus, the bridging apparatus can learn information about the address of a device on a network at an early point.

REFERENCE SIGNS LIST

10: network A transmission-reception control unit, 20: network B transmission-reception control unit, 30: presence-check-frame transmission control unit, 40: address-table managing unit, 100: bridging apparatus, 101: bridging apparatus, 201: device 1, 202: device 2, 203: device 3, 204: device 4, 205: device 5, 206: device 6, 301: network A, 302: network B, 303: network C, 410: address, 420: network I/F, 430: aging time

The invention claimed is:

1. A bridging apparatus comprising:
   an address-table managing unit configured to manage an address table in which devices connected to networks are registered, start an aging timer for registered addresses in the address table, and delete registered addresses in the address table at an expiration of the aging timer;
   a presence-check-frame transmission control unit configured to transmit a presence check frame for checking whether a device is connected to a network; and
   at least one network transmission-reception control unit configured to call, upon receipt of a response request frame transmitted from a first device connected to a first network toward a second device connected to a second network, the address-table managing unit to register the first device in the address table and check whether the second device is registered in the address table, and when the second device is registered in the address table, transmit an acknowledgement to the first device and transfer the response request frame to the second network, whereas when the second device is not registered in the address table, discard the received response request frame and instruct the presence-check-frame transmission control unit to transmit the presence check frame to the second network, wherein
   the at least one network transmission-reception control unit is configured to prompt the first device to retransmit the response request frame when an acknowledgement to the presence check frame is received from the second device, and
   the address-table managing unit is configured to
      start or restart the aging timer for the first device in response to determining that the at least one network transmission-reception control unit received the response request frame from the first device,
      start the aging timer for the second device in response to determining that the second device becomes registered in the address table, and
      delete registration information for the first device or the second device in the address table in response to determining the expiration of the aging timer for the first device or the second device, respectively.

2. The bridging apparatus of claim 1, wherein, after the at least one network transmission-reception control unit instructs the presence-check-frame transmission control unit to transmit the presence check frame to the second network, upon receipt of the acknowledgement from the second device, the at least one network transmission-reception control unit is configured to call the address-table managing unit to register the second device in the address table.

3. The bridging apparatus of claim 1, wherein the at least one network transmission-reception control unit includes a plurality of network transmission-reception control units.

4. The bridging apparatus of claim 1, wherein the address-table managing unit is configured to output information of the address table to a different bridging apparatus connected to a network and hold, along with the information of the address table of the bridging apparatus, information of an address table of the different bridging apparatus, the information being output from the different bridging apparatus.

* * * * *